April 8, 1947. J. B. REEVES ET AL 2,418,806
GROUP CONTROL OF PLURAL ALTERNATING CURRENT MOTORS
Filed Sept. 22, 1945 2 Sheets-Sheet 1
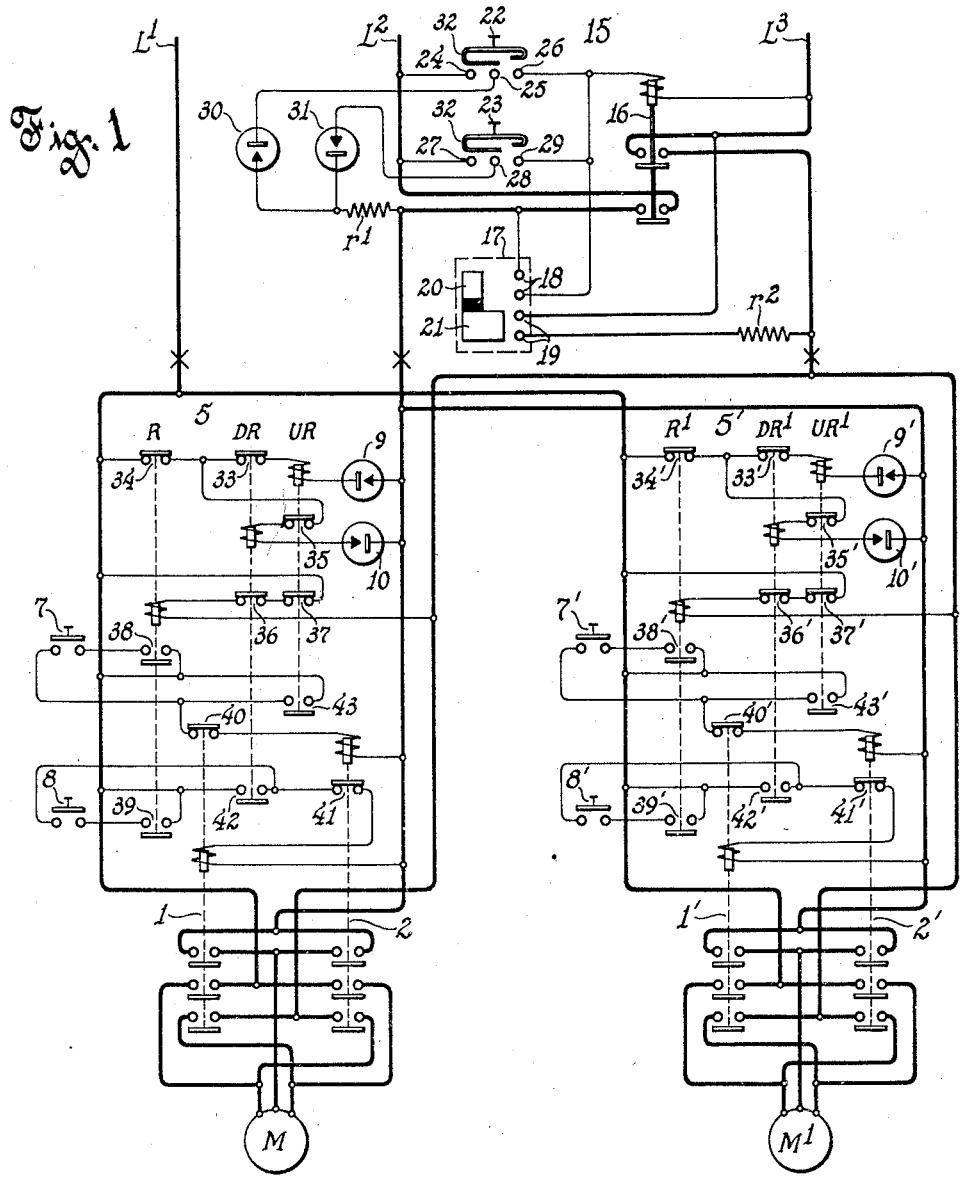
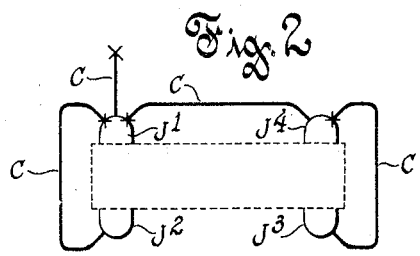
Inventors
James B. Reeves
Edwin W. Seeger
By
Attorney Inventors.
James B. Reeves.
Edwin W. Seeger.
By Frank B. Hubbard
Attorney.

Patented Apr. 8, 1947

2,418,806

UNITED STATES PATENT OFFICE 2,418,806

GROUP CONTROL OF PLURAL ALTERNATING CURRENT MOTORS

James B. Reeves, Whitefish Bay, and Edwin W. Seeger, Wauwatosa, Wis., assignors to Cutler-Hammer, Inc., Milwaukee, Wis., a corporation of Delaware Application September 22, 1945, Serial No. 617,994

15 Claims. (Cl. 172—179)

1

This invention relates to improvements in controllers for electric motors and while not limited thereto is particularly applicable to control of motor operated portable jacks.

In practice such jacks commonly have mounted thereon controllers for operating them individually, whereas it is frequently desired to afford control of a group of the jacks jointly, utilizing in so doing their individual controllers. Also such jacks commonly are provided individually with a power supply cable equipped with the plug part of a polarized separable connector to plug into a receptacle connected to the supply lines, or alternatively into a similar receptacle in another jack connected to the supply lines directly or through another jack.

While joint control of such jacks has heretofore been proposed the proposal involved wiring changes or additions found to be very objectionable, and it is an object of the present invention to solve the wiring problems in a more satisfactory manner.

Another object is to enable the desired interconnection and control of the jacks without need of any special control wires, or in other words, to afford control of the units jointly through the medium of the wires constituting the power circuits of the jacks.

Another object is to provide for jacks and other motor driven units very simple and effective control means of the improved character aforeindicated.

Other objects and advantages of the invention will hereinafter appear.

Certain embodiments of the invention are illustrated in the accompanying drawings which will now be described, it being understood that the invention is susceptible of embodiment in other forms without departing from the scope of the appended claims.

In the drawings,

Figure 1 is a diagrammatic view showing control means for controlling independently or jointly the operating motors of a plurality of units, this control involving use of rectifiers;

Fig. 2 shows schematically a group of jacks and the interconnections therefor.

Figure 3:
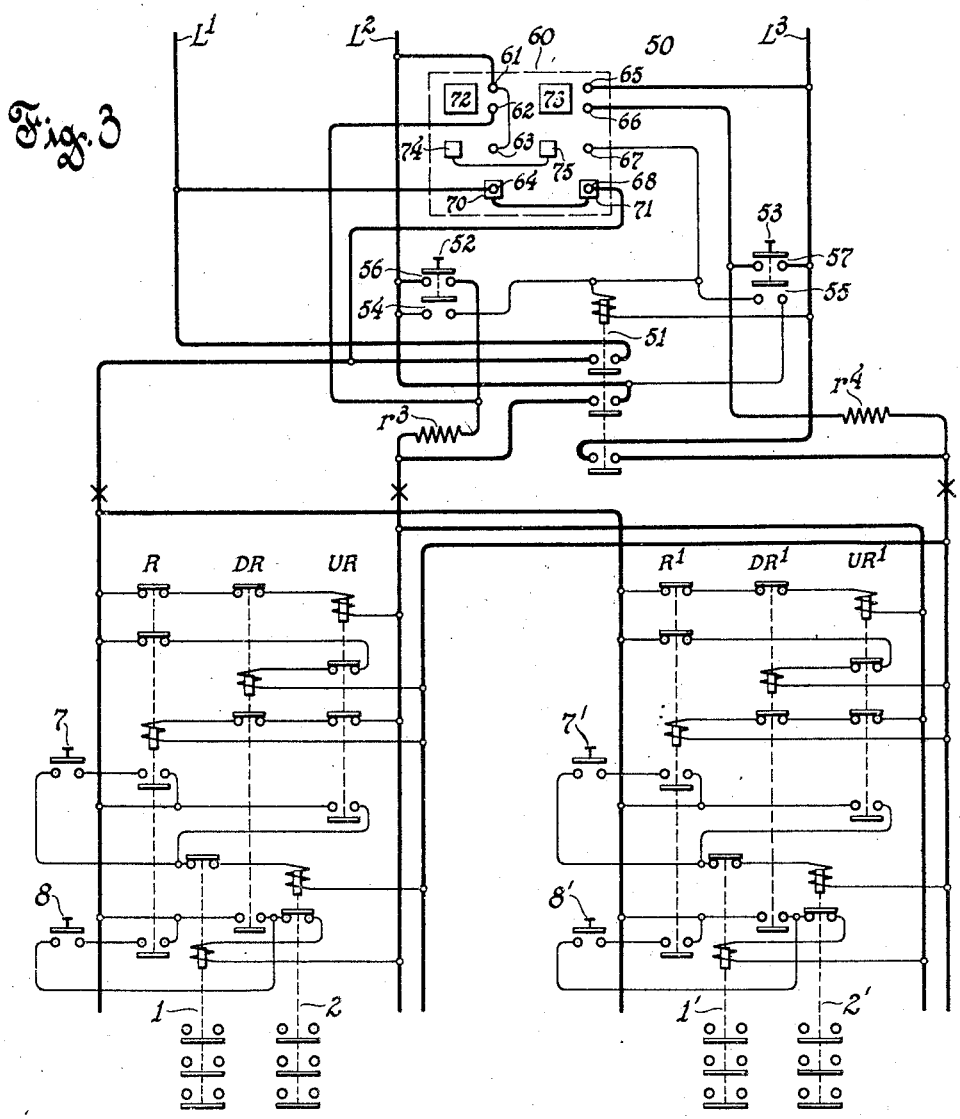
Fig. 3 shows diagrammatically a modified form of control employing circuit commutating means in lieu of the rectifiers of Fig. 1.

Referring to Fig. 1, there are shown two motors M and M¹, which may be assumed to constitute the operating motors for two independent portable jacks. These motors are shown as being of the three phase induction type to be supplied from

2 lines L¹, L² and L³ through individual sets of reversing switches 1—2 and 1'—2', respectively. While Fig. 1 shows only two units to be controlled it will be apparent from the later description of the control equipment illustrated that control of a greater number of like motor operated units merely involves employment of more controllers like the two identical individual controllers illustrated in Fig. 1.

In practice it is commonly desired to employ four motor operated jacks J¹, J², J³ and J⁴, as depicted in Fig. 2, each jack constituting a unit comprising its own motor and control panel, and each unit having a power cable C. Preferably each of these cables C is provided with a polarized plug part to be plugged into a receptacle provided in an adjacent unit, or alternatively to be plugged into a receptacle connected directly to the supply lines. It being common practice to so equip jack units the polarized plug connections are merely indicated by crosses.

The two sets of reversing switches comprise like pairs of triple pole electroresponsive switches. The switches 1 and 2 are part of a group of switches hereinafter referred to as control panel 5, while the switches 1' and 2' are part of a like group of switches hereinafter referred to as control panel 5'. The control panel 5 comprises in addition an electroresponsive up relay UR controlling switch 2, an electroresponsive down relay DR controlling switch 1, and a relay R constituting a medium through which the relays UR and DR are controlled as hereinafter set forth. The panel 5 also has associated therewith push button switches 7 and 8 for selective control of the reversing switches under certain conditions. The control panel 5' comprises relays UR¹, DR¹ and R¹, corresponding respectively to the relays UR, DR and R of panel 5, and with push button switches 7' and 8' corresponding to push button switches 7 and 8 of panel 5. For control of four motor operated units there would be added two more control panels identical with panels 5 and 5'.

The motor circuit connections established by each pair of reversing switches are of conventional and well known form and hence do not require description. The windings of switches 1 and 2 and the windings of relays UR and DR of control panel 5 are arranged for energization by connection across extensions of lines L¹ and L², while the winding of relay R is arranged for energization by connection across extensions of lines L¹ and L³, and the same is true of the corresponding switches and relays of panel 5'. The relay UR and the relay DR, respectively, have in series therewith oppositely disposed rectifiers 9 and 10, while the relays UR¹ and DR¹ of panel 5' respectively have in series therewith oppositely disposed rectifiers 9' and 10'. These rectifiers constitute means through the medium of which their associated relays may be energized selectively through control of the direction of flow of current in the extension of line L², as hereinafter set forth. Such relays constitute means for energizing selectively their respective motor reversing switches in control of the motor driven units jointly. On the other hand, relays R and R' constitute means through the medium of which the aforementioned relays are disabled, thereby to restrict the motor driven units to control individually through the medium of their respective push button switches, as will later be explained in greater detail.

A master control panel 15 completes the means affording control of the motor driven units jointly. This master control panel comprises an electroresponsive switch 16 affording continuity between lines L², L³ and their respective extensions. Also this panel comprises a transfer switch 17 which independently of switch 16 affords continuity between line L³ and its respective extension and which additionally affords an energizing circuit for switch 16. The switch 17 when set in the position shown interrupts the circuits controlled thereby, for group control of the motor driven units, whereas it is adapted to be moved to its circuit closing position for disabling the master control panel to compel control of the motor driven units individually.

The transfer switch 17 comprises two pairs of stationary contact fingers 18 and 19 arranged in a row and two bridging contacts 20 and 21 insulated from one another. The bridging contacts 20 and 21 are so arranged relatively that the contact 21 bridges contacts 19 before contact 20 bridges contacts 18. The purpose of this arrangement is to effect by closure of the transfer switch connection of line L³ to its extension for energization of relays R and R¹ of the panels 5 and 5', and thereafter energization of switch 16 to complete power connections. Also control panel 15 has mounted thereon or associated therewith push button switches 22 and 23 each having two functions including that of energizing switch 16. Each of switches 22 and 23 has three stationary contacts, those of switch 22 being designated 24, 25 and 26, and those of switch 23 being designated 27, 28 and 29. The contacts 24 and 27 are permanently connected to line L² and bridging of contact 24 with contact 26 connects the winding of switch 16 across lines L² and L³, whereas bridging of contact 27 with contact 29 likewise connects the winding of switch 16 across lines L² and L³. However, the push button switches are of any of the well known types adapted to delay bridging of the aforementioned contacts until after they have bridged other of their contacts. Depression of push button switch 22 first bridges contacts 24 and 25 to establish a connection from line L² through a rectifier 30 and a resistance $r^1$ to the extension of line L² independently of switch 16, while switch 23 first connects line L² through a rectifier 31 and resistance $r^1$ to the same extension of line L². The two rectifiers 30 and 31 are connected in circuit in reverse relation, thus making provision for effecting flow of current from line L² to its extension in reverse directions selectively by selective operation of the push button switches 22 and 23. Then upon further depression of the selected push button switch it bridges all three of its contacts to additionally energize switch 16. While as aforeindicated the push button switches may be of any of the well known forms affording closure of two circuits progressively the push buttons for purposes of illustration are shown as carrying spring strips 32 having their contact extremities folded back and offset. One contact portion of the strip 32 bridges two of the stationary contacts and yields to permit the other contact portion to engage the third stationary contact.

Considering the control afforded and assuming transfer switch 17 to be positioned as shown, depression of push button switch 23 causes a flow of current from line L² through rectifier 31 and resistor $r^1$ to the extension of line L² in a direction to pass through the rectifiers 9 and 9' of control panels 5 and 5' and thence through the winding of the up relays UR and UR¹ of said panels to line L¹. These connections are completed through normally engaged contacts 33 and 34 of relays DR and R of panel 5 and corresponding contacts 33' and 34' of relays DR¹ and R¹ of panel 5' and relays UR and UR¹ respond to energize the up reversing switches 2 and 2' of the two motor driven units. On the other hand, depression of push button switch 22 instead of switch 23 effects a reverse flow of current in the extension of line L² to pass through the rectifiers 10 and 10' of the panels 5 and 5' to energize down relays DR and DR¹ which energize the down reversing switches 1 and 1' of the two motor driven units. The energizing circuits of relays DR and DR¹ extend through normally closed contacts 35 and 35' of relays UR and UR¹ in addition to the aforementioned contacts of relays R and R¹. Meanwhile connection of the motors to line L² is interrupted at switch 16 but upon full depression of the selected push button switch the switch 16 is energized to complete motor connections for operation of both motors. The motors are thus jointly under the control of the push button switches 22 and 23 for operation in either direction and interference by the push button switches of panels 5 and 5' is not possible, for as will later appear the latter push button switches are ineffective with relays R and R¹ deenergized, whereas said relays are not energizable while the motors are in operation or are idle, so long as the transfer switch remains in the position shown.

When the transfer switch is moved to engage its contacts 21 and 19 it completes circuit from line L³ through a resistor $r^2$ to and through the windings of relays R and R¹ in parallel to line L¹, the energizing circuit of relay R including normally closed contacts 36 and 37 of relays DR and UR, respectively, and the energizing circuit of relay R¹ including corresponding contacts. Thus relays R and R¹ are caused to respond and relay R then through its normally open contacts 38 and 39 connects push button switches 7 and 8 to line L¹ while relay R¹ through like contacts 38' and 39' similarly connects push button switches 7' and 8'. At the same time relays R and R¹ open their normally closed contacts aforementioned to disable the relays UR, UR¹, DR and DR¹ used for control of the motors jointly. Then upon further movement of the transfer switch to engage its contacts 20 and 18 it connects the winding of switch 16 across lines L² and L³, causing it to respond to energize the extensions of both of said lines. Thereupon either motor may be caused to run in either direction by depressing the proper individualized push button switch. Push button switch 7 establishes circuit from line L¹ through contacts 38 of relay R and its own contacts to and through normally closed contacts 40 of reversing switch 1 to and through the winding of reversing switch 2 to line L², while push button switch 8 establishes circuit from line L¹ through contacts 39 of relay R and its own contacts to and through normally closed contacts 41 of reversing switch 2 to and through the winding of reversing switch 1 to line L². The push button switches 7' and 8' establish like circuits for panel 5'.

In control of the motors jointly as aforedescribed the relays DR and UR control the reversing switches 1 and 2 through contacts 42 and 43 of said relays respectively, and as will be apparent in such manner as to utilize the interlocking contacts 40 and 41 of said reversing switch. Also like control is provided for in panel 5'.

In Fig. 1, as in Fig. 2, the crosses are used to indicate a separable connector and as will be understood the three crosses of Fig. 1 collectively indicate a separable connector of the polarized type.

Referring to the modified controller shown in Fig. 3, the control panels individualized to the motors to be controlled are structurally the same as in Fig. 1 except in respect of number of contacts shown and deletion of the rectifiers, but the circuit connections are somewhat different. The windings of relays UR and UR¹ are connectible across lines L¹ and L² as in Fig. 1, but the windings of relays DR and DR¹ are connectible across lines L¹ and L³ instead of lines L¹ and L². Also in this instance the windings of relays R and R¹ are connectible across lines L² and L³ instead of across lines L¹, L³, whereas the windings of switches 2 and 2' are connectible across lines L¹, L³, and the windings of switches 1 and 1' are connectible across lines L¹ and L².

The control panel 50 of Fig. 3 is quite different from the control panel 15 of Fig. 1 and comprises a 3-pole main switch 51 controlling the continuity of all of the supply lines and normally breaking the continuity thereof, as will be apparent from the drawing. The winding of switch 51 is connectible across lines L² and L³ by either of a pair of push button switches 52, 53 which respectively have contacts 54 and 55 for that purpose. Also push button switches 52 and 53 have additional contacts 56 and 57, respectively, to be engaged in each case in advance of engagement of the other set of contacts, and hence in advance of energization of switch 51, said push button switches being in such respect similar to the switches 22 and 23 of Fig. 1. The contacts 56 of push button switch 52 parallel through a resistor $r^3$ the middle contacts of the main switch 51 to connect line L² to the extension thereof, while contacts 57 of push button switch 53 parallel through a resistor $r^4$ the lowermost contacts of main switch 51 to connect line L³ to the extension thereof. Thus assuming line L¹ to be connected to its extension, it will be apparent that the push buttons 52 and 53 provide for selective energization of the relays UR and DR by selectively connecting lines L² and L³ to their respective extensions, thereby avoiding need of the rectifiers employed in Fig. 1.

Connection of line L¹ to its extension in advance of closure of the main switch is provided for by the transfer switch 60 of Fig. 3. This transfer switch is shown as provided with two series of contact fingers, one series comprising fingers 61, 62, 63, 64, and the other series comprising fingers 65, 66, 67 and 68. With the transfer switch positioned as shown in Fig. 3 the contact fingers are disengaged with the exception of fingers 64 and 68 which are bridged by interconnected segments 70 and 71 to establish a connection paralleling the uppermost contacts of main switch 51, thus connecting line L¹ to its extension to enable the UR and DR relays to be energized selectively by the push button switches 52 and 53, as aforedescribed. Also the transfer switch comprises segments 72 and 73, respectively, to bridge contact fingers 61, 62 and 65, 66 when the transfer switch is moved away from the position shown and during which movement the segments 70 and 71 are disengaged from fingers 64 and 68. Bridging of contact fingers 61 and 62 completes circuit from line L² in parallel with the contacts of push button switch 52 to resistor $r^3$, and thence in parallel with the middle contacts of main switch 51 to the extension of line L². On the other hand, segment 73 in bridging contacts 65 and 66 establishes a connection from line L³ to and through resistor $r^4$ to the extension of line L³, in parallel with the lowermost contacts of main switch 51. This provides for energizing the line extensions across which the windings of relays R and R¹ are connected, thus providing for energization of said relays to function as described in connection with Fig. 1 to render the UR and DR relays ineffective and to transfer control of the individualized panels to their respective push button switches. Then when the transfer switch is fully operated it bridges by the interconnected segments 74 and 75 the contact fingers 63 and 67 to complete circuit from line L² to contact 61 of the transfer switch, and thence to and through the bridged fingers 63 and 67 to and through the winding of switch 51 to line L³. As aforeindicated, completion of this circuit is momentarily delayed to allow prior response of the R relays.

Following response of the R relays the push button switches of the individualized control panel are effective to energize the reversing switches directly and selectively. As previously pointed out, the windings of the reversing switches require connection across different pairs of the supply lines, and as will be apparent they are so connectible by the push button switches. Thus, for example, push button switch 7 completes circuit from the extension of line L¹ through now closed contacts of relay R and through its own contacts and normally closed contacts of switch 1 to and through the winding of reversing switch 2 to line L³, whereas push button switch 8 has a similar connection to line L¹ and completes circuit therefrom to and through down contacts of reversing switch 2 to and through the winding of reversing switch 1 to the extension of line L².

In referring herein to a supply circuit comprising three lines it is contemplated that one of the three lines may be a neutral wire to ground.

What we claim as new and desire to secure by Letters Patent is:

1. The combination with an alternating current supply circuit comprising at least three lines, alternating current motors to be connected to said circuit, controllers individualized to said motors and each comprising reversing means having control windings to be energized selectively, a master controller, and connections between said individualized controllers and said circuit which extend at least in part through said master controller, said connections comprising a number of conductors not in excess of the number of lines of said circuit, through the medium of which said windings of said individualized controllers are energizable selectively by said master switch for direction control of said motors and through the medium of which said motors are energizable for operation.

2. The combination with an alternating current supply circuit comprising at least three lines, alternating current motors to be connected to said circuit, controllers individualized to said motors and each comprising reversing means having control windings to be energized selectively, a master controller, and connections between said individualized controllers and said circuit which extend at least in part through said master controller, said connections comprising a number of conductors not in excess of the number of lines of said circuit, through the medium of which said windings of said individualized controllers are energizable selectively by said master switch for direction control of said motors and through the medium of which said motors are energizable for operation, such control of said windings and motors being effective at uniform frequency of current traversing said conductors.

3. The combination with an alternating current supply circuit comprising at least three lines, alternating current motors to be connected to said circuit, controllers individualized to said motors and each comprising reversing means having control windings to be energized selectively, a master controller, and connections between said individualized controllers and said circuit which extend at least in part through said master controller, said connections comprising a number of conductors not in excess of the number of lines of said circuit, through the medium of which said windings of said individualized controllers are energizable selectively by said master switch for direction control of said motors and through the medium of which said motors are energizable for operation, said individualized controllers having for their respective said windings circuits to be energized selectively by said master controller through energization of certain of said conductors before said master controller permits energization of all of said conductors.

4. The combination with an alternating current supply circuit comprising at least three lines, alternating current motors to be connected to said circuit, controllers individualized to said motors and each comprising reversing means having control windings to be energized selectively, a master controller, and connections between said individualized controllers and said circuit which extend at least in part through said master controller, said connections comprising a number of conductors not in excess of the number of lines of said circuit, through the medium of which said windings of said individualized controllers are energizable selectively by said master switch for direction control of said motors and through the medium of which said motors are energizable for operation, each of said individualized controllers comprising separate circuits for its said windings and rectifiers in said separate circuits limiting them to relatively reversed unidirectional flows of current, and said master controller comprising rectifiers and means to establish for one of said conductors common to said separate circuits including the first mentioned rectifiers, connection through the second mentioned rectifiers selectively to said supply circuit for unidirectional flow of current in said one conductor in reverse directions selectively.

5. The combination with an alternating current supply circuit comprising at least three lines, alternating current motors to be connected to said circuit, controllers individualized to said motors and each comprising reversing means having control windings to be energized selectively, a master controller, and connections between said individualized controllers and said circuit which extend at least in part through said master controller, said connections comprising a number of conductors not in excess of the number of lines of said circuit, through the medium of which said windings of said individualized controllers are energizable selectively by said master switch for direction control of said motors and through the medium of which said motors are energizable for operation, each of said individualized controllers comprising for selective energization of its said windings separate circuits, one energizable by energization of a given pair of said conductors and the other energizable by energization of a different pair of said conductors, and said master controller comprising means to effect energization of said pairs of conductors selectively prior to permitting energization of all of said conductors.

6. The combinatiton with an alternating current supply circuit comprising at least three lines, alternating current motors to be connected to said circuit, controllers individualized to said motors and each comprising reversing means having control windings to be energized selectively, a master controller, and connections between said individualized controller and said circuit which extend at least in part through said master controller, said connectitons comprising a number of conductors not in excess of the number of lines of said circuit, through the medium of which said windings of said individualized controllers are energizable selectively by said master switch for direction control of said motors and through the medium of which said motors are energizable for operation, said master controller having a position in which it may be set to free from influence thereby said windings of said individualized controllers but to afford connections required for operation of said motors, and each of said individualized controllers comprising means rendering it effective for causing operation of its respective motor when but only when said master controller is so set.

7. The combination with an alternating current supply circuit comprising at least three lines, an alternating current motor, a direction controller for said motor comprising windings to be energized selectively for direction control, a controller comprising a main switch for said motor and also control means for said windings of said direction controller, and connections between said motor and said supply circuit extending at least in part through each of said controllers, said connections comprising a number of conductors not in excess of the number of lines of said supply circuit, through the medium of which said windings of the first mentioned controller are energizable selectively by the second mentioned controller and through the medium of which operative connections for said motor may be completed by said controllers jointly.

8. The combination with an alternating current supply circuit comprising at least three lines, an alternating current motor, a direction controller for said motor comprising windings to be energized selectively for direction control, a controller comprising a main switch for said motor and also control means for said windings of said direction controller, and connections between said motor and said supply circuit extending at least in part through each of said controllers, said connections comprising a number of conductors not in excess of the number of lines of said supply circuit, through the medium of which said windings of the first mentioned controller are energizable selectively by the second mentioned controller and through the medium of which operative connections for said motor may be completed by said controllers jointly, the first mentioned controller comprising means for energizing its said windings selectively and also comprising means rendering the former means ineffective except when the second mentioned controller is set for closure of said main switch and for loss of control over said windings of the first mentioned controller.

9. The combination with an alternating current supply circuit, of an alternating current motor, a controller comprising reversing means for said motor having windings to be energized selectively, a second controller comprising a main switch for said motor and also means to control said windings of the first mentioned controller, connections between said motor and said supply circuit extending at least in part through said controllers and comprising a number of conductors not in excess of the number of line terminals of said motor, and rectifiers through the medium of which the direction of flow of current in one of said conductors is made effective for selection of said windings of the first mentioned controller and through the medium of which said second controller while maintaining said main switch open, may effect unidirectional flow of current in said one conductor in either direction.

10. The combination with an alternating current supply circuit, of an alternating current motor, a controller comprising reversing means for said motor having windings to be energized selectively, a second controller comprising a main switch for said motor and also means to control said windings of the first mentioned controller, connections between said motor and said supply circuit extending at least in part through said controllers and comprising a number of conductors not in excess of the number of line terminals of said motor, and rectifiers through the medium of which the direction of flow of current in one of said conductors is made effective for selection of said windings of the first mentioned controller and through the medium of which said second controller while maintaining said main switch open, may effect unidirectional flow of current in said one conductor in either direction, the first mentioned controller having means effective to energize its said windings selectively when but only when said second controller is set to lose control of said windings and to close said main switch.

11. The combination with an alternating current supply circuit having at least three lines, an alternating current motor, a controller comprising a main switch, a controller comprising reversing means having control windings to be energized selectively and connections between said motor and said supply circuit extending at least in part through said two controllers and comprising a number of conductors between said controllers not exceeding the number of line terminals of said motor, the first mentioned controller comprising means effective with said main switch open, to energize selectively different pairs of said conductors to which said windings of the second mentioned controller are respectively connected and said second mentioned controller then being operable to effect energization of all of said conductors for full energization of said motor.

12. The combination with an alternating current supply circuit having at least three lines, an alternating current motor, a controller comprising an electroresponsive reverser for said motor, control relays for said reverser, means to control said reverser independently of said relays, and electroresponsive means to limit control of said reverser to said relays or to said electroresponsive means selectively, a second controller comprising a main switch for said motor and also means to control said relays and the second mentioned means, and connections between said motor and said supply circuit extending at least in part through each of said controllers and comprising a number of conductors not exceeding the number of line terminals of said motor to afford power supply to all line terminals of said motor, and current for full control of the first mentioned controller by the second mentioned controller.

13. The combination with an alternating current supply circuit having at least three lines, an alternating current motor, a controller comprising an electroresponsive reverser for said motor, control relays for said reverser, means to control said reverser independently of said relays, and electroresponsive means to limit control of said reverser to said relays or to said electroresponsive means selectively, a second controller comprising a main switch for said motor and also means to control said relays and the second mentioned means, and connections between said motor and said supply circuit extending at least in part through each of said controllers and comprising a number of conductors not exceeding the number of line terminals of said motor, to afford power supply to all line terminals of said motor and current for full control of the first mentioned controller by the second mentioned controller, said second mentioned controller effecting selective energization of said relays to control said reverser prior to closing said main switch.

14. The combination with an alternating current supply circuit having at least three lines, an alternating current motor, a controller comprising an electroresponsive reverser for said motor, control relays for said reverser, means to control said reverser independently of said relays, and electroresponsive means to limit control of said reverser to said relays or to said electroresponsive means selectively, a second controller comprising a main switch for said motor and also means to control said relays and the second mentioned means, and connections between said motor and said supply circuit extending at least in part through each of said controllers and comprising a number of conductors not exceeding the number of line terminals of said motor, to afford power supply to all line terminals of said motor and current for full control of the first mentioned controller by the second mentioned controller, said second mentioned controller effecting selective energization of said relays prior to closing said main switch, or alternatively effecting closure of said main switch after first energizing said electroresponsive means to place the reverser under the control of said means to control it independently of said relays.

15. The combination with an alternating current supply circuit having at least three lines, an alternating current motor, a controller comprising an electroresponsive reverser for said motor, control relays for said reverser, means to control said reverser independently of said relays and electroresponsive means to limit control of said reverser to said relays or to said electroresponsive means selectively, a second controller comprising a main switch for said motor and also means to control said relays and the second mentioned means, and connections between said motor and said supply circuit extending at least in part through each of said controllers and comprising a number of conductors not exceeding the number of line terminals of said motor, to afford power supply to all line terminals of said motor and current for full control of the first mentioned controller by the second mentioned controller, said second mentioned controller being operable to energize one of said relays and then close said main switch, with said electroresponsive means deenergized to prevent interference by said other control means for said reverser and being alternatively operable to close said main switch after first energizing certain only of said conductors to energize said electroresponsive means to transfer control of said reverser from said relays to said other control means therefor.

JAMES B. REEVES.
EDWIN W. SEEGER.